US006786646B2

(12) United States Patent
Handke

(10) Patent No.: US 6,786,646 B2
(45) Date of Patent: Sep. 7, 2004

(54) MOUNT FOR A PISTON-CYLINDER ASSEMBLY

(75) Inventor: Günther Handke, Euerbach (DE)

(73) Assignee: ZF Sachs AG, Schweinfurt (DE)

( * ) Notice: Subject to any disclaimer, the term of this patent is extended or adjusted under 35 U.S.C. 154(b) by 75 days.

(21) Appl. No.: 10/211,875

(22) Filed: Aug. 2, 2002

(65) Prior Publication Data

US 2003/0025257 A1 Feb. 6, 2003

(30) Foreign Application Priority Data

Aug. 3, 2001 (DE) .......................................... 101 38 197

(51) Int. Cl.[7] .......................... F16C 19/12; B60G 13/00; F16F 3/10
(52) U.S. Cl. ....................................... 384/617; 267/220
(58) Field of Search .............................. 384/609, 592, 384/607, 611–622; 267/220, 179; 280/124.155

(56) References Cited

U.S. PATENT DOCUMENTS

| 4,434,977 A | | 3/1984 | Chiba et al. | |
| 4,618,127 A | | 10/1986 | Poupard et al. | |
| 4,981,287 A | | 1/1991 | Cothenet | |
| 5,158,269 A | * | 10/1992 | Hein et al. | ................... 267/220 |
| 5,226,635 A | * | 7/1993 | Nakamura | ................... 267/220 |
| 5,263,694 A | * | 11/1993 | Smith et al. | .......... 280/124.155 |
| 5,975,505 A | * | 11/1999 | Yoshimoto et al. | .......... 267/220 |
| 6,267,512 B1 | | 7/2001 | Beghini et al. | ............. 384/609 |

FOREIGN PATENT DOCUMENTS

| DE | 72 46 448 | 10/1973 | ........... B60G/13/08 |
| DE | 195 43 995 | 5/1997 | ............. F16F/1/38 |
| FR | 2319813 | 2/1977 | ............. F16F/9/54 |

* cited by examiner

Primary Examiner—Thomas R. Hannon
(74) Attorney, Agent, or Firm—Cohen, Pontani, Lieberman & Pavane

(57) ABSTRACT

Mount for a piston-cylinder assembly, especially for a vibration damper, where one end of the piston rod is immovably connected to upper and lower flanges of the mount. A radial, ring-shaped space is formed at least at the lower support flange of the mount, and an elastomeric body is clamped between the lower support flange and the upper support flange, this body being connected to the component to be damped. A support body, which is connected immovably to the support flange and immovably to the piston rod, is provided in the ring-shaped space to absorb the support forces acting on the support flange.

11 Claims, 5 Drawing Sheets

MOUNT FOR A PISTON-CYLINDER ASSEMBLY

BACKGROUND OF THE INVENTION

1. Field of the Invention

The invention pertains to a mount for a piston-cylinder assembly, especially for a vibration damper, where one end of the piston rod is immovably connected to the mount and an elastomeric support body connected to the structural component to be damped is clamped between an upper support flange and a lower support flange forming a ring-shaped space around the piston rod.

2. Description of the Related Art

FIG. 1 shows the upper mount for a piston-cylinder assembly, namely, for a vibration damper in the form of a shock-absorbing strut, as currently used in large numbers of passenger vehicles. The essential advantages of the mount, also referred to as a thrust bearing, are its simple design and the associated price. From experience it is known that this mount is sufficient to meet all the strength requirements imposed by a passenger vehicle.

There are also vehicles, however, such as delivery trucks or heavy all-terrain vehicles for which, although the strength requirements may still be met, the known mount does not always provide a desirable safety cushion because of the range of variation of possible loads on the vehicle.

The simplest possibility is obviously to select one of the mounts used in commercial vehicles. This solution, however, would mean considerable extra cost for the mount and ultimately would involve the use of a component far larger than necessary.

SUMMARY OF THE INVENTION

The task of the present invention is to improve the mount known according to the state of the art in such a way as to increase its strength.

This task is accomplished according to the invention in that a support body, which is immovably connected to one of the support flanges and also immovably connected to the piston rod, is provided to absorb the cardanic forces acting on the support flange.

The use of the additional support body makes it possible to keep the previous mount. Thus, a solution is available for cases in which the anticipated demand for mounts is relatively small, and the cost of this solution can also be considered acceptable when measured against the increase in load capacity thus obtained.

In a first variant, the support body is designed as an angle ring and is installed on the bottom surface of the support flange. The shape of the support body alone provides a favorable relationship between the increase in strength and the added weight.

As an alternative, the support body can be designed as a solid ring and be supported axially on a shoulder underneath the support flange. It is recommended that the solid ring be made of an elastic material.

To compensate for manufacturing tolerances, the support body has free spaces, which, after installation of the support body, are at least partially equalized as a result of its intrinsic elasticity in conjunction with a press-fit with respect to the piston rod and/or the support flange.

In another solution, a support body is provided on the side of the upper support flange facing away from the lower support flange. Of course, this solution can also be combined with the one previously described.

In addition, a support body can be provided in a second ring-shaped space between the upper support flange and the fastening means.

An especially large increase in the load capacity of the mount can be achieved by supporting one side of the support body on the upper support flange and the other side on the fastening means. This variant can be improved even more with respect to load capacity by designing the support body as a sleeve with a bottom. The bottom helps carry the load, and, if the bottom is closed, it also protects the fastening means.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
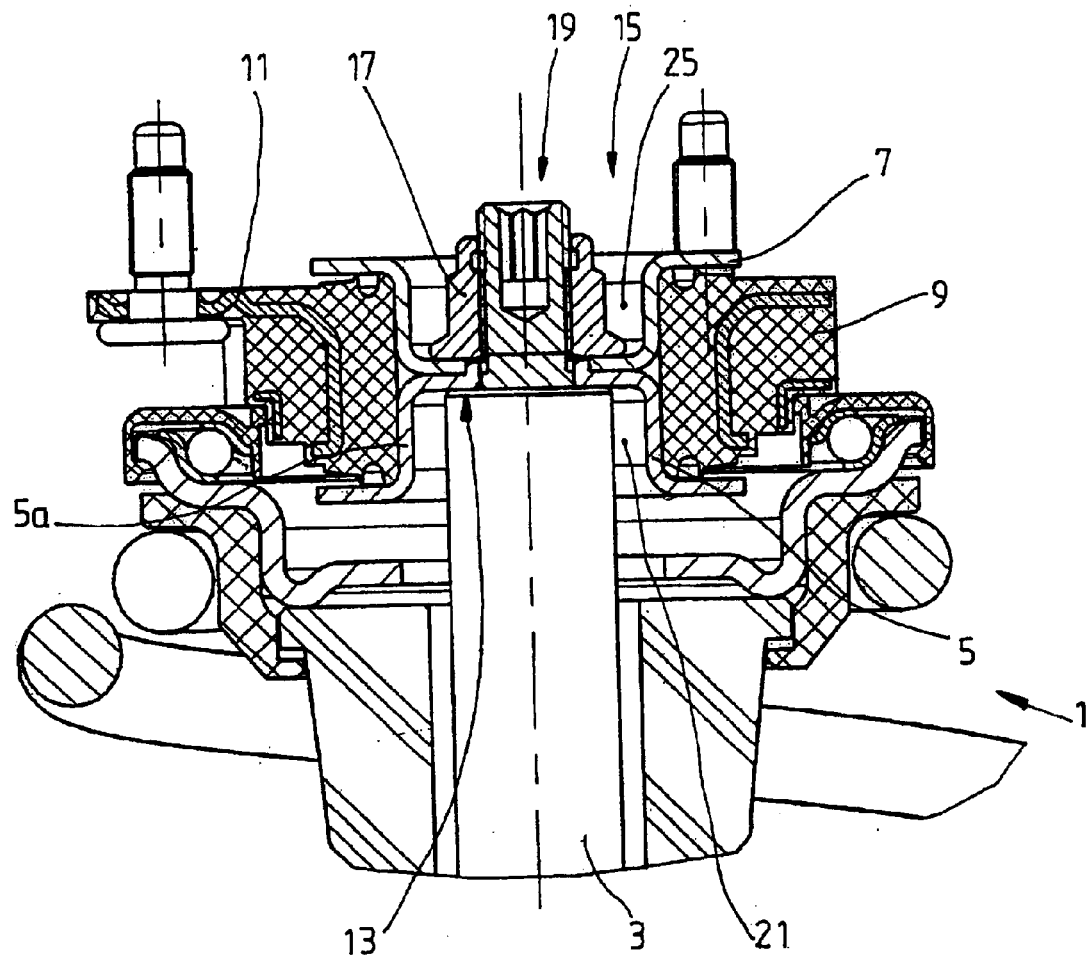
FIG. 1 shows a mount according to the state of the art.

FIG. 1 shows a mount 1 according to the state of the art for a piston-cylinder assembly in the form of a shock-absorbing strut, of which a piston rod 3 is shown, among other parts. An elastomeric body 9 is clamped between a lower support flange 5 and an upper support flange 7. This body has a core 11, which can be bolted to a motor vehicle.

At the end facing the mount, the piston rod 3 has a shoulder 13, on which the mount is axially supported. As a fastening means 15 for the mount, a sleeve nut 17 is screwed onto a threaded section of the piston rod. An internal profile section 19 in the piston rod can be used to prevent the rod from rotating while the sleeve nut is being screwed on.

The lower support flange 5 is designed as a cup, and it cooperates with a sleeve part 5a and the piston rod 3 to form a first ring-shaped space 21. An upper support flange 7 is designed as an almost perfect mirror image of the lower flange and cooperates with the sleeve nut 17 to form the boundary of a second ring-shaped space 25.

When the core 11 of the mount 1 is designed as a rigid component and the piston rod 30 moves cardanically as a result of the intermediate elastomeric body 9, the width of the two ring-shaped spaces 21, 25 changes in accordance with the load.

Figure 2:
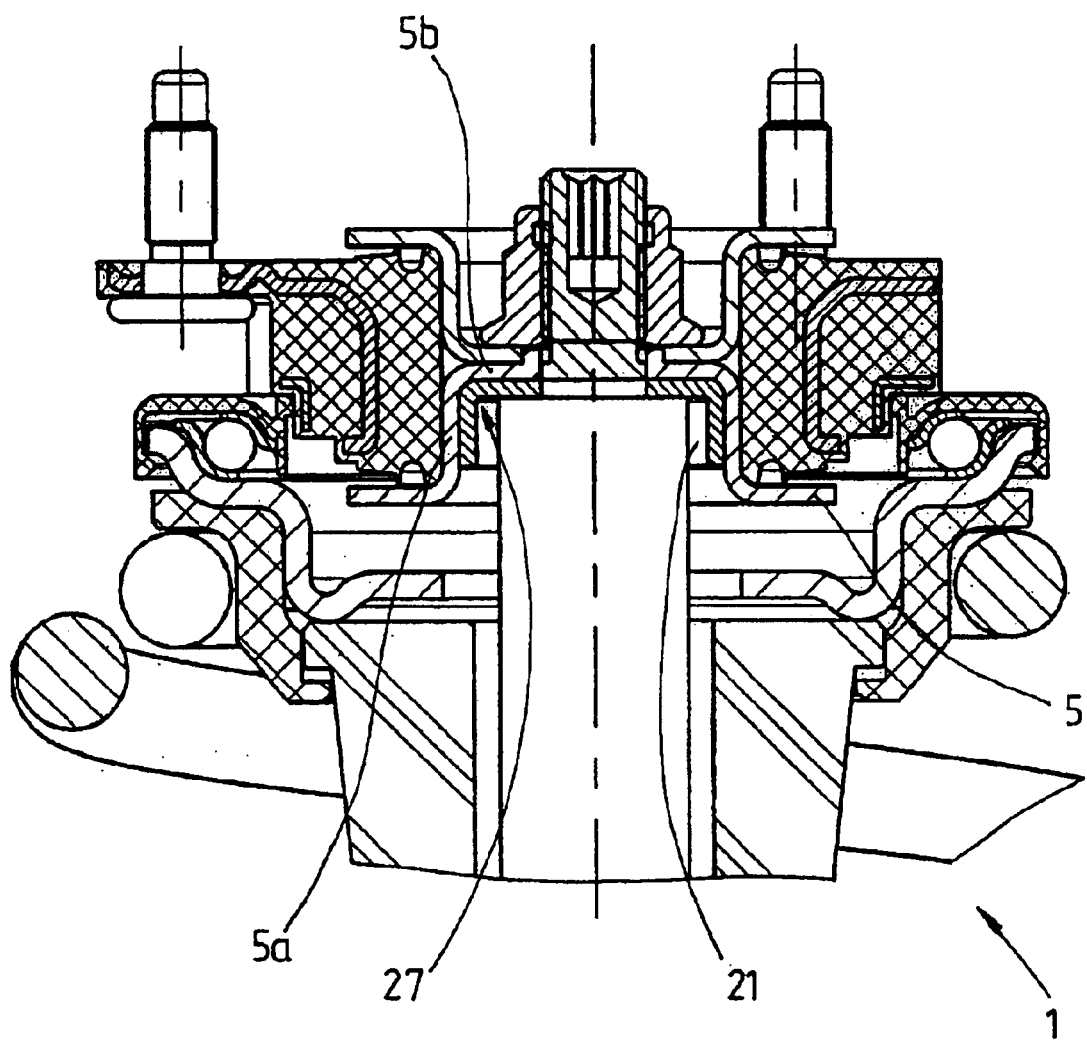
FIGS. 2–5 show exemplary embodiments of the mount according to the invention.

In the design according to FIG. 2, a support body 27 in the form of a metal angle ring is provided inside the first ring-shaped space 21. The angle ring conforms to the cup-shaped contour of the lower support flange 5, especially to the sleeve part 5a and the bottom 5b. Finally, the support body 27, which is immobilized with respect to the mount and the piston rod 3, reinforces the lower support flange 5, because the support body 27 supports the lower support flange during the cardanic motion of the piston rod described above.

Figure 3:
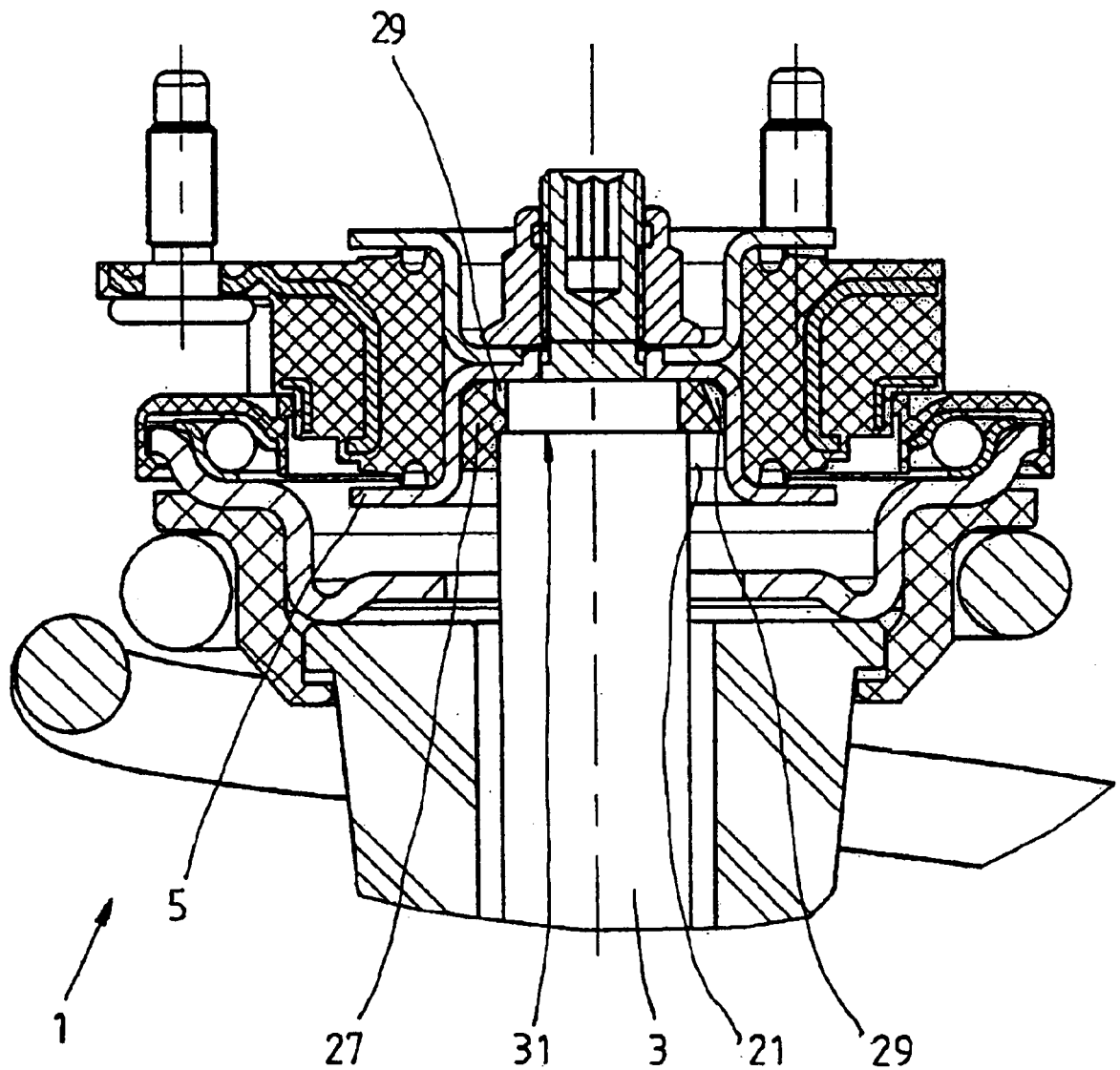

In the variant according to FIG. 3, the support body 27 is a solid body, preferably made of an elastomeric material, and preferably fills the entire first ring-shaped space 21 in the radial direction. To compensate for manufacturing tolerances, the support body can have relief spaces 29, which, after the installation of the support body, are equalized as a result of the press-fit between the lower support flange 5 and the piston rod 3. It is indicated that the piston rod has another shoulder 31 for the axial fixation of the support body.

Figure 4:
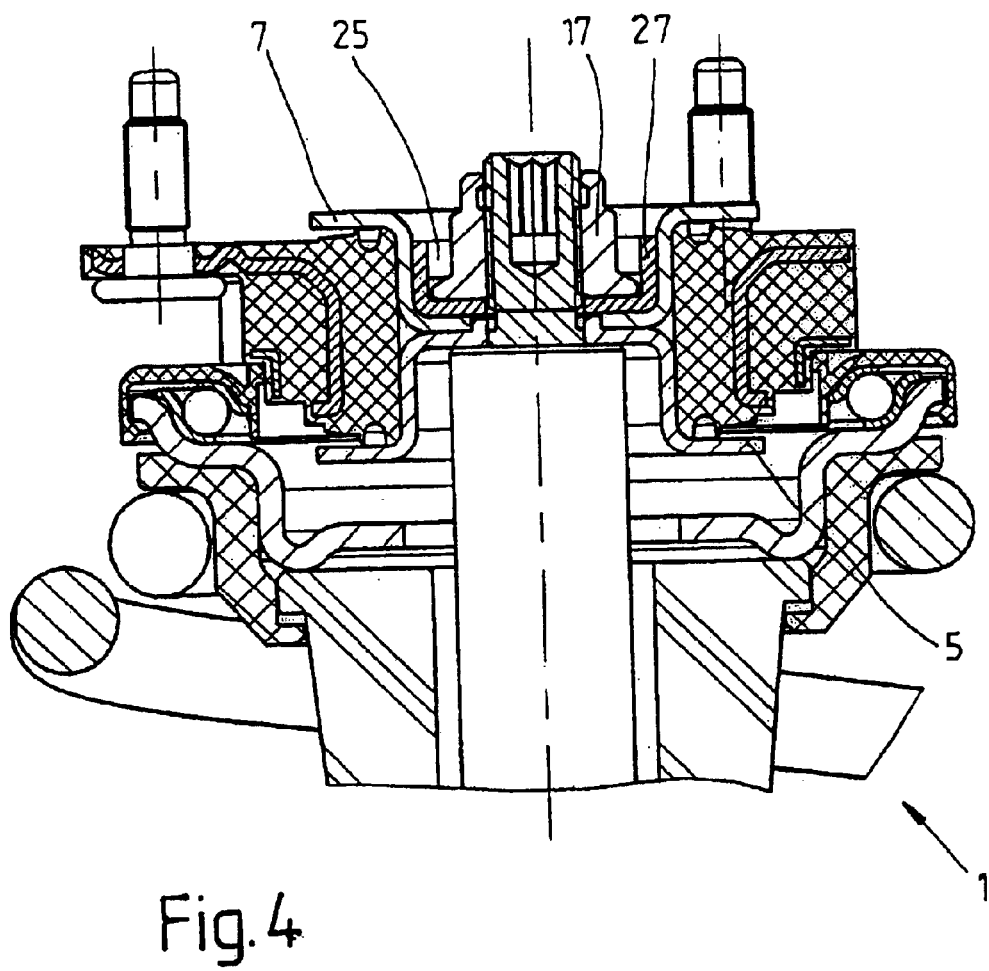

In FIG. 4, the principle of FIG. 2 is transferred to the upper support flange 7 and the second ring-shaped space 25. Here the support body 27 is laid on the side of the upper support flange 7 facing away from the first support flange 5 and held immovably in place there by the fastening means 15. The support length of the support body is determined as a function of the inside diameter of the upper support flange 7 and the outside diameter of the sleeve nut 17, because access must be provided for a screwdriver or wrench.

Figure 5:
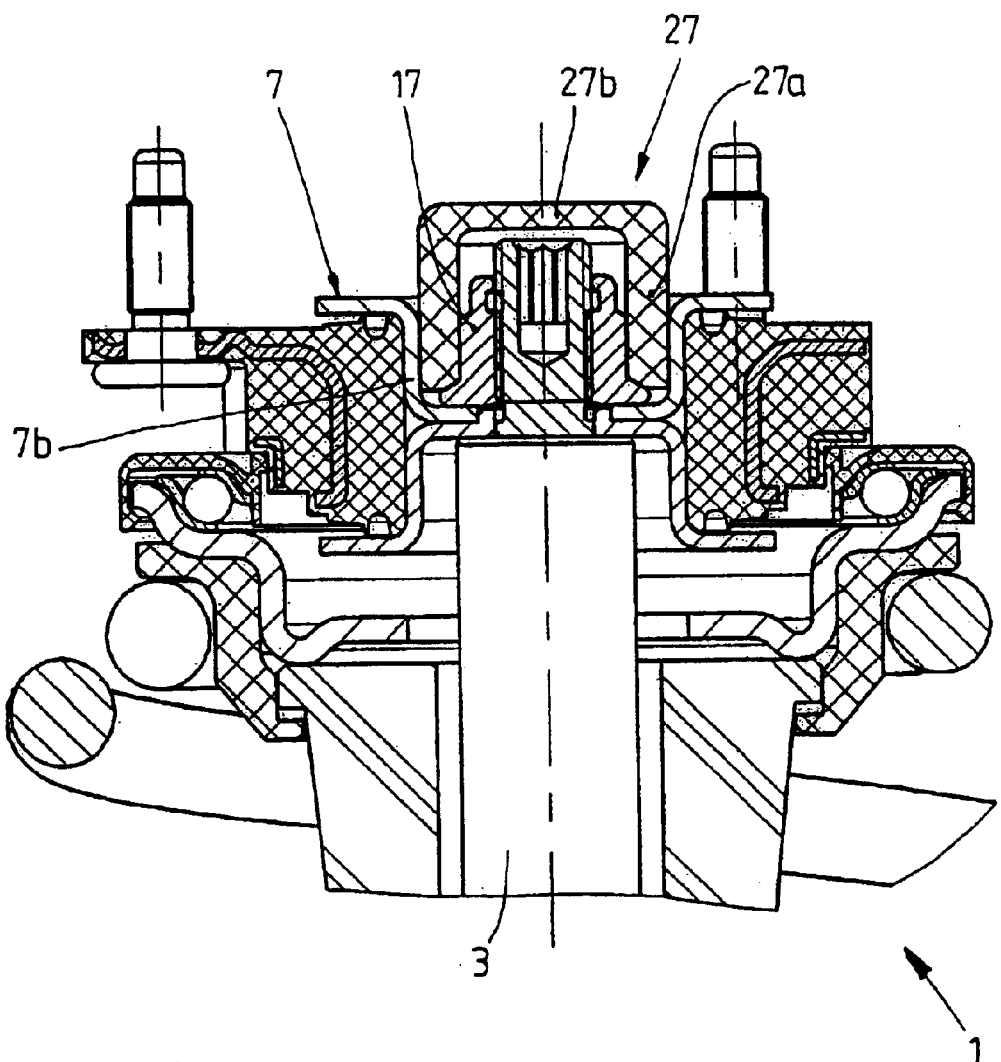

In FIG. 5, a ring-shaped support body 27, preferably made of an elastomeric material, is clamped by its sleeve 27a in the second ring-shaped space 25 against the sleeve 7b of the upper support flange 7. This minimizes or prevents any elastic deformation of the upper support flange 7. The entire width of the ring-shaped space 25 can be utilized, and the support body 27 can be clamped between the upper support flange and the sleeve nut. The greatest degree of support for the forces in play is achieved when the support body 27 has a bottom 27b and the fastening means covers at least most of it. Thus the threaded section is also protected against external influences.

The variants for the ring-shaped spaces 21, 25 of the mount 1 shown in FIGS. 2–5 can also be combined as required.

The invention is not limited by the embodiments described above which are presented as examples only but can be modified in various ways within the scope of protection defined by the appended patent claims.

I claim:

1. A mount for a piston cylinder assembly having a piston rod extending from a cylinder, the piston rod having an end outside the cylinder, the mount comprising an upper support flange and a lower support flange fixed to said piston rod, one of said support flanges being a cup-shaped support flange having a sleeve part and a bottom, an elastomeric body, for connecting to a structural component to be damped, located radially outside of said sleeve part and clamped between said upper support flange and said lower support flange, a ring-shaped space formed between said sleeve part of said one of said support flanges and said piston rod, and a support body provided in said ring-shaped space and fixed to said one of said support flanges and said piston rod for absorbing cardanic forces acting on said flanges.

2. A mount as in claim 1 wherein said ring-shaped space is formed between said lower support flange and said piston rod, and said support body is an angle ring received in said ring-shaped space.

3. A mount as in claim 1 wherein said piston rod has an annular shoulder facing said end, and said support body is a solid ring support axially on said shoulder.

4. A mount as in claim 3 wherein said support body is an elastomeric body having relief spaces which take up manufacturing tolerances when said support body is press fit into said ring-shaped space.

5. A mount as in claim 1 wherein said ring-shaped space is formed between said upper support flange and said piston rod, and said support body is received in said ring-shaped space.

6. A mount as in claim 5 further comprising a fastener fixed to the end of said piston rod, said support body being received between said upper support flange and said fastener.

7. A mount as in claim 6 wherein said support body is supported on said upper support flange and said fastener.

8. A mount as in claim 7 wherein said support body comprises a sleeve and a bottom, said bottom being supported on said upper support flange and said fastener.

9. A mount as in claim 1 wherein both of said support flanges are cup-shaped support flanges, each said support flange having a sleeve part and a bottom, said elastomeric body lying radially outside of said sleeve parts.

10. A mount as in claim 9 wherein said bottoms are located against each other.

11. A mount as in claim 1 wherein said support body is a metal angle ring which conforms to the one of the support flanges.

* * * * *